Nov. 12, 1968  J. A. WATKINS  3,411,155
MAGNETIC DETENT APPARATUS FOR ELECTROMAGNETIC
INDICATOR WHEEL STRUCTURE
Filed Sept. 29, 1966  4 Sheets-Sheet 2

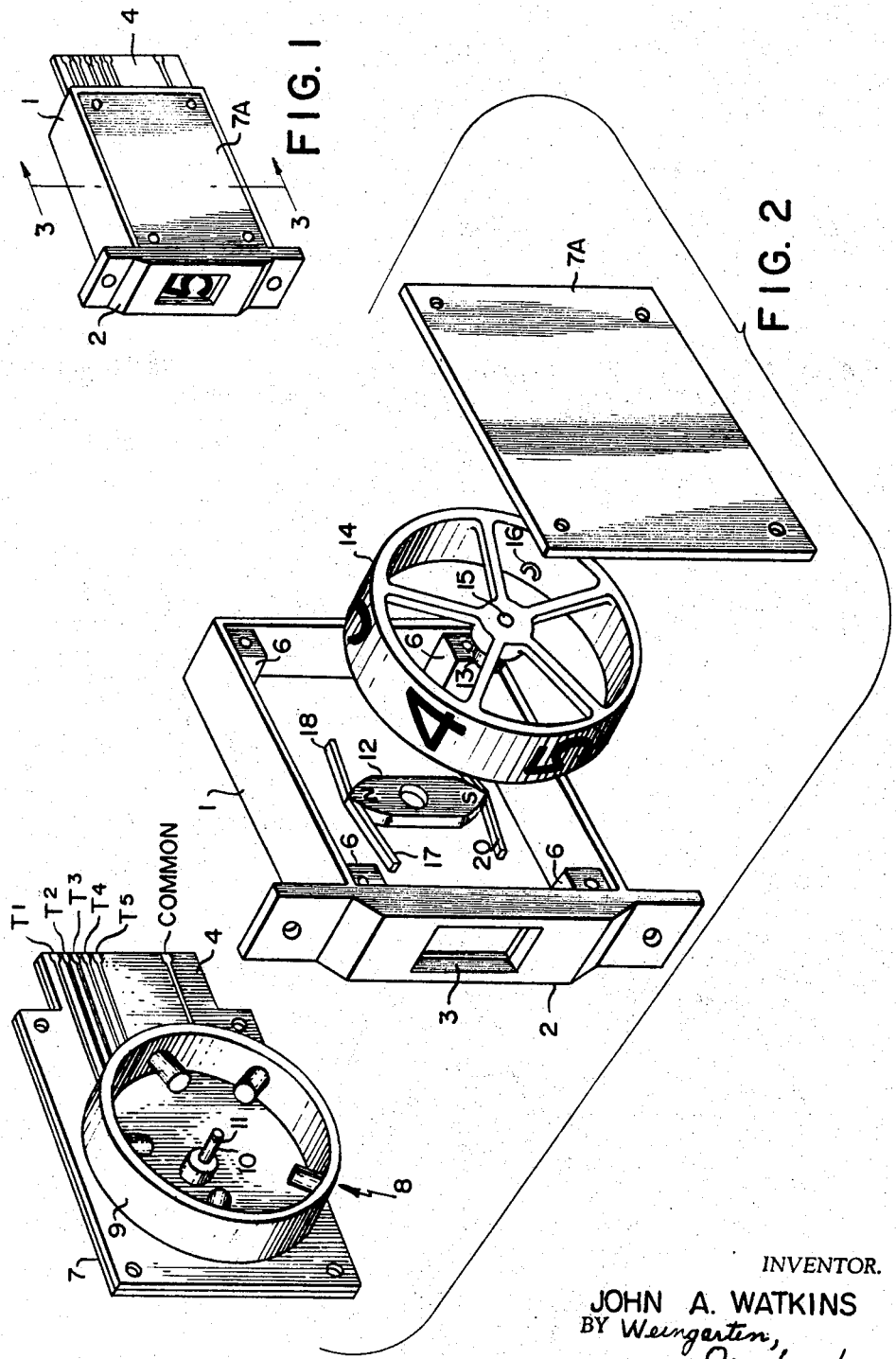

INVENTOR.
JOHN A. WATKINS
BY Weingarten,
Orenbuch
& Lahive
ATTORNEYS

Nov. 12, 1968  J. A. WATKINS  3,411,155
MAGNETIC DETENT APPARATUS FOR ELECTROMAGNETIC
INDICATOR WHEEL STRUCTURE
Filed Sept. 29, 1966  4 Sheets-Sheet 3

INVENTOR.
JOHN A. WATKINS
BY Weingarten,
Orenbuch
+ Sahive
ATTORNEYS

United States Patent Office 3,411,155
Patented Nov. 12, 1968

---

3,411,155
MAGNETIC DETENT APPARATUS FOR ELECTROMAGNETIC INDICATOR WHEEL STRUCTURE
John A. Watkins, Cheshire, Conn., assignor, by mesne assignments, to United-Carr Incorporated, Boston, Mass., a corporation of Delaware
Filed Sept. 29, 1966, Ser. No. 582,938
3 Claims. (Cl. 340—378)

This invention relates in general to indicators of the type having a window in which can be displayed symbols which are carried upon a rotatable drum. More particularly, the invention pertains to "memory" apparatus for holding the drum in a precisely fixed position to cause a symbol to be exactly registered in the display window.

The invention is an improvement over the electromagnetic indicator disclosed in U.S. Patent No. 2,943,313 granted to Gordon et al. on June 28, 1960. The Gordon patent concerns an indicator employing a toroidal stator having an annular ferro-magnetic core upon which a plurality of windings are mounted. The windings, when electrically energized, cause the stator to establish a discretely oriented magnetic field. Under the influence of the magnetic field, a rotor having a number wheel fastened to a permanent magnet rotates to align the magnet with the stator's magnetic field. Upon the stator's windings being electrically deenergized, the permanent magnet of the rotor is attracted by magnetizable detent elements to a position slightly offset from the position the magnet had when it was aligned with the field of the stator. In the offset position, a number on the wheel is registered in the window of Gordon's indicator. The magnetizable elements employed in Gordon's indicator are arrayed in the space between the rotor's permanent magnet and the stator. For each symbol on the wheel, the stator, when electrically energized, is able to establish a magnetic field of discrete orientation and the magnetizable elements provide an equal number of offset positions to "lock" the wheel in a fixed position when the stator is electrically deenergized. The accuracy with which any number on the wheel is centered in the window of the indicator, when the stator is electrically unenergized, ideally is governed by the force of attraction between the rotor's permanent magnet and the magnetizable detent elements. The magnetizable elements used by Gordon provide his indicator with a "memory," because when the indicator is electrically deenergized, the number last displayed in the window remains in view until the indicator is commanded to display another number. In addition, the magnetizable elements are used by Gordon to pull the rotor to an offset position when the stator is deenergized so that when the stator is again energized the rotor is never required to turn to a diametrically (i.e. 180°) opposite position.

Although the indicator disclosed in the Gordon patent employs a toroidal stator, the detenting apparatus has been used in indicators employing "radial pole" stators. As the name implies, a "radial pole" stator is a structure having poles protruding radially inwardly from an annular ferromagnetic core. Usually the radial poles are spaced at regular intervals around the annulus and each radial pole is surrounded by its own winding which can be separately energized by an electrical signal.

In the manufacture of electromagnetic indicators employing magnetizable detent elements arranged in the manner disclosed in the Gordon patent, difficulties have been encountered in centering the numbers of other symbols in the indicator's window. Some of the difficulty in obtaining precise centering of the symbols in the indicator's window is attributed to the location of the magnetizable detent elements within the space enclosed by the stator and some of the difficulty is attributed to variations in the rotor's permanent magnet. In the conventional indicator, the permanent magnet of the rotor is required to have two sharply defined diametrically opposed magnetic poles. Because of variations among the permanent magnets employed in the manufacture of the indicators, the magnets do not line up with the detent pins in exactly the same position and relocation of the detent pins is required to insure that proper registration of each symbol in the indicator's window is obtained. It is, consequently, an objective of the invention to provide improved "offset" and "memory" apparatus for an electromagnetic indicator which causes the symbols displayed by the indicator to be accurately registered in the display window.

The invention resides in employing in the indicator a stator having radial poles spaced at equal intervals around the ferromagnetic annular core and in providing the permanent magnet of the rotor with ferrous detent arms which extend from the poles of the permanent magnet. Upon electrical energization of the stator, the rotor is constrained by the magnetic field established by the stator to turn to a position when a pole of the permanent magnet is aligned with a radial pole of the stator. In that position, at least some of the ferrous detent arms are adjacent other radial poles of the stator. When the stator is electrically deenergized, the magnetic field established by the stator collapses and the attraction between the ferrous detent arms and their adjacent radial poles pulls the rotor to an offset position where a symbol on the drum is centered in the window of the indicator.

The invention, both as to its construction and its mode of operation, can be better understood from the following exposition when it is considered in conjunction with the accompanying drawings in which:

FIG. 1 depicts a perspective view of the preferred embodiment of the invention;

FIG. 2 is an exploded view of the preferred embodiment of the invention;

Figure 3:
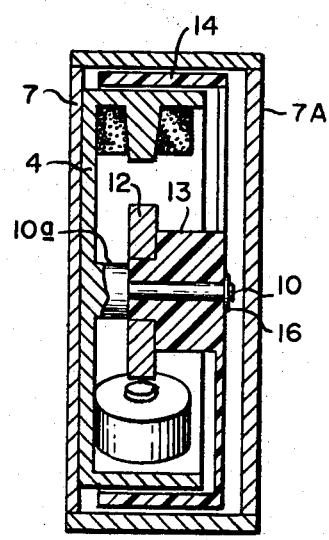
FIG. 3 is a cross-section of the assembled indicator taken along the plane 3—3 in FIG 1.

Referring now to preferred embodiment of the invention depicted in FIGS. 1, 2 and 3 of the drawings, that embodiment employs a housing 1 having a front panel 2 in which there is a window 3 for displaying symbols carried upon a drum. Electrical signals are impressed upon the indicator through the terminals T1, T2 …

T5 and COMMON of a printed circuit board 4 extending from the rear of the indicator housing.

Housing 1, as ilustrated in FIG. 2, is a hollow rectangular body having posts 6 at its corners. The posts 6 are internally threaded to permit end plates 7 and 7A to be secured to opposite sides of the housing by screws which engage the threaded posts. Printed circuit board 4 has its wiring protected by an insulative coating and the board is clamped against the housing by end plate 7. As several indicators may be mounted side by side or an indicator may be used in an environment where external magnetic fields of appreciable strength are present, the end plates 7 and 7A are, preferably, fabricated of a material of high magnetic permeability to act as magnetic shields.

Secured to printed circuit board 4 is a stator 8 employing a ferromagnetic annular core 9 having inwardly protruding radial poles upon which windings W1, W2 ... W5 are mounted. Each winding can be separately energized by applying an electrical signal between the COMMON terminal and one of the terminals T1, T2 ... T5. Also secured to printed circuit board 4 is a shaft 10 which extends through the geometric center of annular core 9.

The rotor of the indicator has a permanent magnet 12 secured to the hub 13 of a drum 14. Upon the periphery of drum 14 are marked the symbols that are to be displayed in the window 3 of the indicator. Usually the symbols are alpha-numeric characters and are of a size permitting only one character at a time to be fully presented in the window. For the purpose of this exposition, the symbols marked on the drum's periphery are the ten arabic decimal numerals 0, 1, 2 ... 9. The permanent magnet 12 is rigidly attached to drum 14 so that the two members rotate as a unit. Drum 14 has a central aperture 15 which permits it to be mounted over shaft 10. When so mounted, drum 14 encircles the stator 8 whereas permanent magnet 12 is within the enclosure of the stator. To retain the rotor so that it cannot slip off shaft 10, a groove 11 is provided near the shaft's end for accommodating a C-shaped lock member 6. Shaft 10 has an enlarged portion 10a, best shown in FIG. 3, which provides a shoulder against which hub 13 bears to position the permanent magnet in the same plane as the radial poles of the stator. In more sophisticated embodiments of the invention, self aligning jewelled bearings or ball bearings can be employed to facilitate turning of the rotor.

Figure 4:
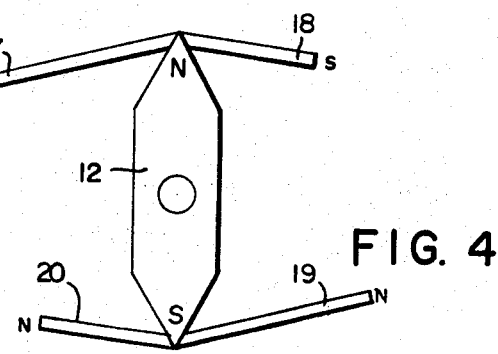
FIG. 4 depicts the permanent magnet of the rotor and the attached ferrous detent arms.

FIG. 4 depicts the permanent magnet 12 of the rotor and the ferrous detent arms that are attached to the permanent magnet. The permanent magnet is, essentially, a bar magnet having salient, wedge-shaped, magnetic poles. Extending from each of the salient magnetic poles are ferrous detent arms 17, 18, 19 and 20. The arms are preferably made of a material, such as soft iron, having high magnetic permeability. The magnetic polarity induced at the end of each arm is, of course, opposite to the polarity of the pole to which it is attached. In effect, the assemblage of FIG. 4 is a six pole magnet having a single strong north pole, a single strong south pole, two weak north poles and two weak south poles.

Figure 5:
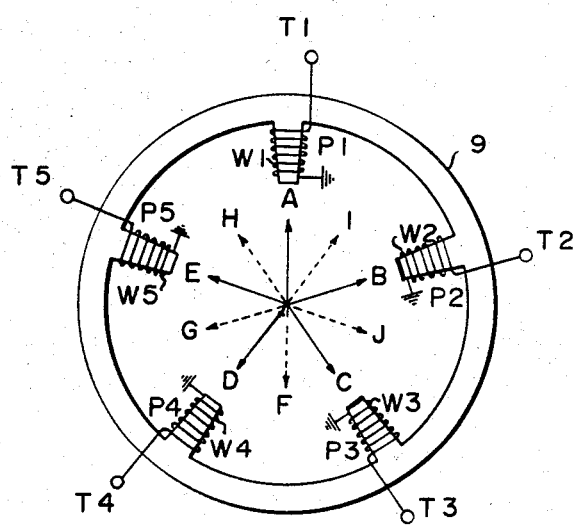
FIG. 5 shows, in schematic form, a stator having five radial poles for producing ten magnetic field vectors.

FIG. 5 depicts, in schematic form, the stator of the indicator which is here shown to have five radial poles P1, P2 ... P5 spaced at regular intervals around annular core 9. Each pole is encircled by a winding W1, W2 ... W5 that can be separately excited by an electrical signal. Preferably the poles and windings are similar so that the magnetic field established by electrical energization of any winding is equal in intensity to the magnetic field established by any other of the windings.

Figure 6:
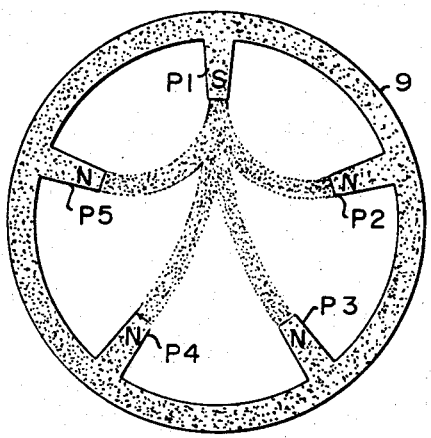
FIG. 6 depicts the magnetic field pattern produced by energizing one of the stator windings.

The pattern of the magnetic field established by energizing a single winding of the stator is depicted in FIG. 6. Assuming that the winding W1 on pole P1 is energized to cause that pole to be a north magnetic pole, then all the other radial poles become south magnetic poles and the flux pattern of the magnetic field is substantially as indicated by the stippling in FIG. 6. The magnetic field can be represented in that figure by a vector whose direction is toward the north magnetic pole and whose length is a measure of the magnetic field intensity. The direction of the vector can be reversed, merely by reversing the current flow in winding W1 to cause pole P1 to be a south magnetic pole. Therefore, each radial pole is able to establish either of two magnetic field vectors by controlling the direction of current flow in the winding. In FIG. 5, the ten magnetic field orientations that can be established by energizing the windings on the five radial poles are indicated by vectors A, B ... K. In response to the magnetic field established by electrical energization of the stator, permanent magnet 12 causes the rotor to turn and align the permanent magnet with the magnetic field vector.

Figure 9:
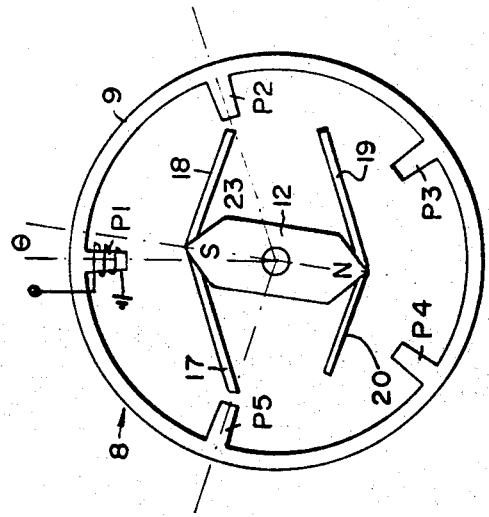
FIG. 9 depicts the station taken by the rotor when the stator is electrically deenergized.
Figure 10:
FIG. 10 depicts the centered position of the symbol in the indicator's window when the rotor is in the FIG. 9 station.
Figure 7:
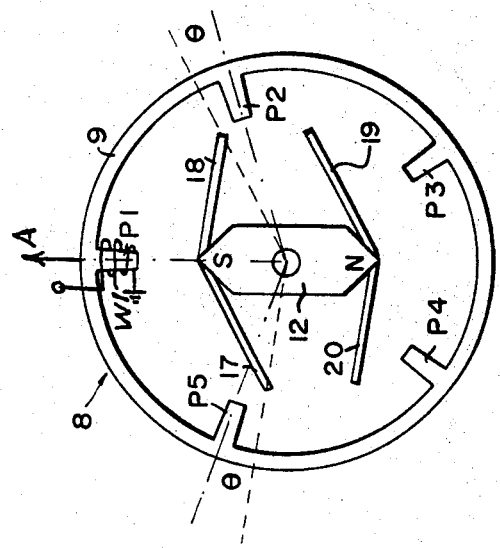
FIG. 7 illustrates the position of the ferrous detent arms when the permanent magnet of the rotor is aligned with a radial pole.
Figure 8:
FIG. 8 shows the position of the symbol in the indicator's window when the permanent magnet is aligned with a radial pole.

In FIG. 7, the energized winding W1 on radial pole P1 causes the stator to establish a magnetic field represented by the vector A. Under the constraint of that magnetic field, the rotor turns and aligns the permanent magnet 12 with vector A. When thus aligned, the end of detent arm 17 is adjacent to but offset from pole P5 by the angle θ, the end of detent arm 128 is adjacent to and offset from pole P2 by that same angle, and the symbol on drum 14 is, as shown in FIG. 8, in an off-centered position in the window of the indicator. Upon cessation of the electrical signal to winding W1, the magnetic field established by the stator collapses. Thereupon, the attraction between pole P5 and the adjacent end of arm 17 and the attraction between pole P2 and the adjacent end of arm 18 cause the rotor to turn through the angle θ and assume the station depicted in FIG. 9. In that station the end of detent arm 17 is aligned with pole P5, the end of detent arm 18 is aligned with pole P2, and the symbol on the drum, as indicated in FIG. 10, is centered in the indicator's window. In moving to the station depicted in FIG. 9, the force of attraction between the south pole of the permanent magnet and radial pole P1 is overcome by the force of attraction between the ends of arms 17 and 18 and radial poles P5 and P2. Although the ends of arms 17 and 18 are relatively weaker magnetic poles than the south pole of the permanent magnet, the tips of arms 17 and 18 are closer to the radial poles P5 and P2 than is the south magnetic pole of magnet 12 to radial pole P1.

Where winding W1 is energized by an electrical signal which causes the F vector to be established, rather than the A vector, the rotor takes the position 180° opposite to that depicted in FIG. 7. In that 180° opposite position, arm 19 is in the position occupied in the figure by arm 17, arm 20 is in the position occupied in the figure by arm 18, and the north pole of the permanent magnet is in the position occupied in the figure by the magnet's south pole. Upon cessation of the electrical signal to winding W1, the rotor is similarly drawn through the angle θ to a station where a different symbol is now centered in the window of the indicator.

Figure 12:
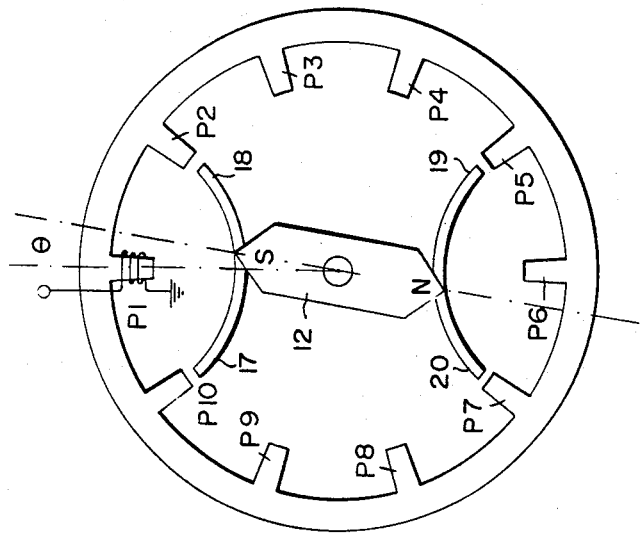
FIG. 12 illustrates the position taken by the permanent magnet and the detent arms when the stator of FIG. 11 is electrically deenergized.
Figure 11:
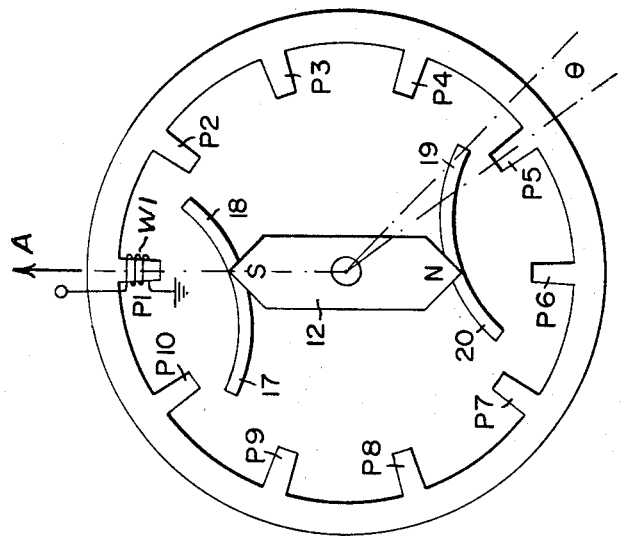
FIG. 11 shows a stator having an even number of radial poles spaced at equal intervals around the annular core and depicts the position of the detent arms when the permanent magnet is aligned with a pair of radial poles of the electrically energized stator.

The detenting action obtained with the ferrous arms can be enhanced by employing a stator having an even number of radial poles spaced equally about the ferromagnetic core, as shown in FIGS. 11 and 12. Where a stator having an odd number of equally spaced radial poles is employed, as in FIGS. 7 and 9, only two of the four ferrous detent arms are effective in determining the "offset" position of the rotor because the other two ferrous detent arms are too far away from the radial poles for an appreciable attractive force to be present.

With a stator having an even number of radial poles, as in FIG. 11, the four ferrous detent arms 17, 18, 19 and 20 are adjacent to four radial poles when the permanent magnet is aligned with the A vector established by the electrically energized winding W1 on pole P1. The four ferrous detent arms are, however, offset from their adjacent radial poles by the angle θ. Upon termination of the electrical signals to winding W1, the stator's field collapses, and the four detent arms are attracted to the adjacent radial poles and cause the rotor to move through the angle θ to an "offset" position, as in FIG. 12. In the "offset"

position, a symbol on drum 14 is centered in the window of the indicator.

Preferably, the ends of ferrous detent arms 17, 18, 19 and 20, have the same configuration and area as the ends of the radial poles of the stator. To enhance the attractive force of the ferrous detent arms, the ends of those arms travel in a circular path that passes very close to the tips of the radial poles. The north and south magnetic poles of the permanent magnet of the rotor, however, travel in a path that is not close to the tips of the radial poles. When the stator is electrically deenergized, the force of attraction between the radial poles of the stator and the poles of the rotor's permanent magnet which tends to hold the rotor in its vector aligned position is less than the force of attraction between the detent arms and the radial stator's radial poles which tends to pull the rotor to an "offset" position and, consequently, the rotor moves to the "offset" station. In the "offset" station, the gap between the ferrous detent arms and the radial poles is small so that the force tending to lock the rotor in the "offset" position is sufficient to hold the rotor stationary until the stator is again electrically energized.

In view of the multitude of ways in which the invention can be embodied, it is not intended that the scope of the invention be restricted to the precise structures illustrated in the drawings or described in the exposition. Rather, it is intended that the scope of the invention be construed in accordance with the appended claims and that within that scope be included only those structures which in essence utilize the invention.

What is claimed is:
1. In a symbol display device of the type utilizing:
  (1) a panel having a window;
  (2) a stator having radial poles protruding inwardly from an annular ferromagnetic core, the radial poles carrying electrically energizable windings for causing the stator to selectively establish any one of a plurality of discretely oriented magnetic fields; and
  (3) a rotor having a permanent magnet attached to a drum, the permanent magnet being encircled by the stator's annular core, the drum having symbols marked upon its periphery and being situated to present its symbols in the window of the panel, the rotor being mounted to permit the permanent magnet to rotate into alignment with the discretely oriented magnetic field established by the stator;
the improvement comprising
  a ferrous detent arm secured to and extending from a pole of the rotor's permanent magnet, the ferrous detent arm having its free end adjacent to a radial pole of the stator when the rotor's permanent magnet is aligned with a magnetic field established by the electrically energized stator, and the attractive force between the ferrous detent arm and the adjacent radial pole causing the rotor to move to a different position upon collapse of the stator's magnetic field.

2. In a symbol display device of the type utilizing
  (1) a panel having a window;
  (2) a stator for selectively establishing any one of a plurality of discretely oriented magnetic fields, the stator employing an annular ferromagentic core having inwardly protruding radial poles spaced at regular intervals around the core, the radial poles carrying electrically energizable windings; and
  (3) a rotor having a permanent magnet attached to a drum which bears symbols upon its periphery, the drum being situated to present its symbols in the window of the panel, the permanet magnet being encircled by the stator's annular core, the rotor being mounted to permit the permanent magnet to rotate into alignment with the discretely oriented magnetic field established by the stator;
the improvement comprising
  a plurality of ferrous detent arms secured to and extending from a pole of the rotor's permanent magnet, the ferrous detent arms having their ends adjacent to radial poles of the stator when the rotor's permanent magnet is aligned with a magnetic field established by the electrically energized stator, and the force of attraction between the ferrous detent arms and the adjacent radial poles causing the rotor to move, when the stator is electrically deenergized, to a station where a symbol is fully presented in the panel's window.

3. The symbol display device according to claim 2, wherein the stator has an even number of radial poles, and the rotor's permanent magnet has ferrous detent arms secured to and extending from both its poles.

No references cited.

JOHN W. CALDWELL, *Primary Examiner.*

H. I. PITTS, *Assistant Examiner.*